United States Patent [19]

Kim

[11] Patent Number: 5,087,513
[45] Date of Patent: Feb. 11, 1992

[54] FLAME RETARDANT FILM AND COMPOSITE CONTAINING SUPERABSORBENT POLYMER

[75] Inventor: Dai W. Kim, Chatham, N.J.

[73] Assignee: Hoechst Celanese Corp., Somerville, N.J.

[21] Appl. No.: 624,171

[22] Filed: Dec. 7, 1990

[51] Int. Cl.$^5$ .................... B32B 27/06; B32B 27/14
[52] U.S. Cl. .................... 428/283; 264/109; 264/216; 428/317.9; 428/327
[58] Field of Search .................... 428/283, 317.9, 327; 264/109, 216

[56] References Cited

U.S. PATENT DOCUMENTS

| | | | |
|---|---|---|---|
| 3,171,820 | 3/1965 | Volz | 521/61 |
| 3,497,469 | 2/1970 | Blair | 428/339 |
| 3,699,038 | 10/1972 | Boom | 210/23 |
| 3,821,067 | 6/1974 | Taylor | 428/91 |
| 3,833,951 | 9/1974 | Hurwitz | 5/459 |
| 3,914,503 | 10/1975 | Brown | 428/315 |
| 3,914,513 | 10/1975 | Brown et al. | 428/425 |
| 3,925,137 | 12/1975 | Kamei | 156/278 |
| 4,076,663 | 2/1978 | Masuda et al. | 525/54.31 |
| 4,340,706 | 7/1982 | Obayashi et al. | 526/207 |
| 4,670,477 | 6/1987 | Kelly et al. | 521/52 |
| 4,725,628 | 2/1988 | Garvey et al. | 521/137 |
| 4,725,629 | 2/1988 | Garvey et al. | 521/137 |
| 4,731,391 | 3/1988 | Garvey | 521/137 |
| 4,758,466 | 7/1988 | Dabi et al. | 428/283 |
| 4,828,699 | 5/1989 | Soehngen | 210/500.28 |

*Primary Examiner*—William J. Van Balen
*Attorney, Agent, or Firm*—James M. Hunter, Jr.

[57] ABSTRACT

Disclosed by this invention are polybenzimidazole polymer/superabsorbent polymer articles. These articles are prepared by either mixing the superabsorbent polymer particulates with the polybenzimidazole polymer solution during the formation of the polybenzimidazole article, or forming a composite of a polybenzimidazole film or fiber material layer with a superabsorbent polymer particulate containing layer. These polybenzimidazole products, either with the superabsorbent polymer particulates interspersed within their structure of as composites, absorb large amounts of fluid while retaining the flame retardancy and chemical unreactivity of conventional polybenzimidazole materials.

23 Claims, No Drawings

FLAME RETARDANT FILM AND COMPOSITE CONTAINING SUPERABSORBENT POLYMER

BACKGROUND OF THE INVENTION

1. Field of Invention

This invention relates to flame retardant materials and a process for their production. More particularly, this invention relates to a flame retardant material containing within its structure or within the structure of a composite attached thereto a superabsorbent material and a process for the production of said materials.

2. Prior Art

Recently there has been enhanced interest in producing highly absorbent materials, particularly for use in products such as sanitary napkins, diapers, bed pads, incontinent garments, etc. In addition, composite materials containing superabsorbent polymers have been designed that combine the high absorbent capacity of the superabsorbent polymers with certain characteristics incumbent in the material which has been combined with the superabsorbent polymer.

For example, U.S. Pat. No. 4,758,466 discloses a foam-fiber composite useful in sanitary napkins as an absorbent. It is comprised of an absorbent structure made from large particles of an amino-ether hydrophilic foam which may contain a superabsorbent material and which is uniformly distributed and heat bonded to a fibrous material, which fibrous material is made from two different kinds of fibers such as a polyethylene and a polyester.

U.S. Pat. No. 4,605,402 discloses a softened absorbent composite structure comprised of a fibrous web containing a superabsorbent material and, in addition, a wicking layer subjected to microcorrugating.

U.S. Pat. No. 4,724,114 discloses a process for the production of a two layer melt blown superabsorbent material comprised of a first wood fiber layer and a second layer containing a superabsorbent material U.S. Pat. Nos. 4,560,372 and 4,676,784 disclose disposable absorbent products in a layered structure comprised of an absorbent material mixed with a fibrous layer of resilient, synthetic fibers such as polyesters, polyethylene, polypropylene and the like.

U.S. Pat. Nos. 4,454,268, 4,337,181 and 4,133,784 disclose various types of films partially comprised of water absorbent polymers. While these patents disclose starch-based, water absorbent polymers prepared from the combination of starch and ethylene acrylic acid copolymers, they fail to disclose the particular absorbent polymer disclosed herein or the mixture of an absorbent polymer in a composite structure to produce a flame retardant material.

U.S. Pat. No. 3,669,103 discloses water swellable, water insoluble polymeric sorbents for the absorption of aqueous fluids wherein said polymeric sorbents are lightly crosslinked polymers. This patent also discloses the use of a water insoluble polyurethane foam as a support for the polymeric absorbent. However, it fails to disclose the use of a superabsorbent polymer in general, the absorbent polymer disclosed herein or the use of an absorbent polymer in a composite flame retardant material.

U.S. Pat. Nos. 4,731,391, 4,725,628 and 4,725,629 disclose processes for the production of a superabsorbent polyurethane foam. The polyurethane foam is based on an interpenetrating polymer network of a crosslinked polyurethane and a substantially linear addition polymer containing a plurality of chain segments made of functional groups containing repeating units. The functional group of the repeating unit is selected from carbamoyl substitutes and the alkali metal and ammonia salts thereof.

U.S. Pat. No. 4,713,069 discloses a breathable cloth-like barrier which is substantially impervious to liquid water but permeable to water vapor. This patent discloses a barrier especially well suited as the outer cover of certain absorbent articles. However, it fails to disclose the flame retardant, superabsorbent material of the instant invention.

U.S. Pat. No. 4,726,976 discloses a composite substrate which is especially useful as a cover sheet for disposable articles, said substrate is comprised of an inner polyethylene thermoplastic film secured to and between the inner surfaces of a top layer and a bottom layer of a non-woven polypropylene fibrous web. However, it fails to disclose the flame retardant, superabsorbent material of the instant invention.

Polybenzimidazole has been extensively studied because of its high degree of flame retardancy as well as its chemical stability. Polybenzimidazole polymers have been formed into fibers, films and other shaped articles. See for example, U.S. Pat. Nos. 3,699,038, 3,720,607, 3,737,042, 3,841,492 and 3,851,025.

U.S. Pat. No. 4,828,699 discloses a process for the production of microporous polybenzimidazole articles. These microporous polybenzimidazole articles are generally formed by preparing a polybenzimidazole material containing a leachable additive and leaching said additive from said material. Impregnated in these articles may be various absorbent agents including certain chemical encounter agents. However, the use of a superabsorbent polymer within these polybenzimidazole articles is not disclosed, nor is the combining of a polybenzimidazole article in a composite with a second material containing a superabsorbent polymer.

SUMMARY OF THE INVENTION

This invention discloses a polybenzimidazole product containing a superabsorbent polymer product characterized as being flame retardant, chemical resistant and fluid absorbent prepared by the following steps:

(a) preparing a polybenzimidazole polymer solution in a dispersing solvent;

(b) mixing with said polybenzimidazole polymer solution a superabsorbent polymer; and (c) forming a polybenzimidazole polymer having the superabsorbent polymer interspersed within its structure.

Another embodiment of this invention is a polybenzimidazole material/superabsorbent polymer composite product comprising:

(a) a polybenzimidazole polymer material first layer;

(b) a superabsorbent polymer particulate material containing second layer; and (c) means for binding the polybenzimidazole polymer layer to the superabsorbent polymer layer.

The polybenzimidazole polymer product containing a superabsorbent polymer particulate interspersed within its structure can be formed into clothing fabric which is highly resistant to chemical reaction and possesses a high degree of thermal stability. Various types of chemical absorbents can also be impregnated within the structure of polybenzimidazole polymer material to further enhance the utility of the fibers. Polybenzimidazole fabrics containing absorbents produced by this process will possess a high degree of moisture absorbance and thus, will be highly useful for the clothing of fire fighters, military personnel, chemical workers, etc., who may be exposed to high temperatures.

The composite structures prepared from the combination of a polybenzimidazole polymer layer and a material containing a superabsorbent polymer layer can also be used in clothing fabric (e.g., wherein the polybenzimidazole polymer comprises the outer fabric layer), thus combining the benefits of a polybenzimidazole material which is highly resistant to chemical reaction and possesses a high degree of thermal stability with the high water absorbent capability of a superabsorbent material. This composite finds great use in clothing for fire fighters or military personnel and, in addition, is useful for certain special purpose shoes or headgear where resistance to chemical reaction and thermal stability is critical.

DETAILED DESCRIPTION OF INVENTION

The polybenzimidazole polymeric material used to form the polybenzimidazole product of the present invention is a linear polybenzimidazole. Polybenzimidazoles are a known class of heterocyclic polymers. Typical polymers of this class and their preparation are more fully described in U.S. Pat. No. 2,895,948, U.S. Re. Pat. No. 26,065, and in the Journal of Polymer Science, Vol. 50, pages 511-519 (1961), which are herein incorporated by reference. The polybenzimidazoles consist essentially of recurring units of the following Formulas I and II:

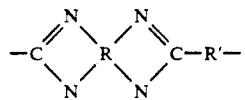

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran; and

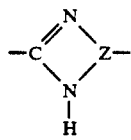

wherein Z is an aromatic nucleus having the nitrogen atoms forming the benzimidazole ring paired upon adjacent carbon atoms of the aromatic nucleus. Preferably, aromatic polybenzimidazoles are selected, e.g., from polymers consisting essentially of the recurring units of Formulas I and II wherein R, is an aromatic ring or heterocyclic ring.

As set forth in U.S. Pat. No. 3,174,947 and U.S. Reissue Pat. No. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) an aromatic dicarboxylic acid, (b) the diphenyl ester of an aromatic dicarboxylic acid or a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'-(m-phenylene)-5,5'-bibenzimidazole;
poly-2,2'- (pyridylene-3",5") -5,5'-bibenzimidazole;
poly-2,2'-(furylene-2", 5") - 5,5'-bibenzimidazole;
poly-2,2'-(naphthalene-1",6") -5,5'-bibenzimidazole;
poly-2,2'-(biphenylene-4",4") -5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'-(m-phenylene)-5,5'-di(benzimidazole) ether;
poly-2,2'-(m-phenylene)5,5'-di(benzimidazole) sulfide;
poly-2,2'-(m-phenylene)5,5'-di(benzimidazole sulfone;
poly-2,2'-(m-phenylene)-5,5'-di(benzimidazole) methane;
poly-2',2"-(m-phenylene)-5',5"-di(benzimidazole)propane-2,2; and
poly-2,2'-(m-phenylene)-5',5"-di(benzimidazole) ethylene-1,2
where the double bonds of the ethylene groups are intact in the final polymer.

The preferred polybenzimidazole for use in the present process is one prepared from poly-2,2'-(m-phenylene)-5,5,-bibenzimidazole, the recurring unit of which is:

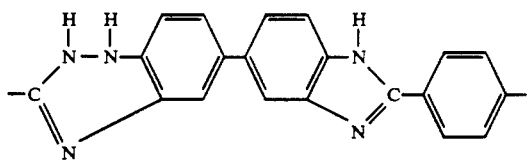

Any polymerization process known to those skilled in the are may be employed to prepare the polybenzimidazole which may then be formed into a semipermeable membrane. Representative techniques for preparing the polybenzimidazole are disclosed in U.S. Pat. Nos. 3,509,108, 3,549,603 and 3,551,389, which are assigned to the assignee of the present invention and are herein incorporated by reference.

With respect to aromatic polybenzimidazoles, preferably equimolar quantities of the monomeric tertraamine and dicarboxyl compound are introduced into a first stage melt polymerization reaction zone and heated therein to a temperature above about 200° C. to 300° C. The reaction is conducted in a substantially oxygen-free atmosphere, i.e., below about 20 ppm oxygen and preferably below about 89 ppm oxygen, until a foamed prepolymer is formed having an inherent viscosity, expressed as deciliters per gram, of at least 0.1 and preferably from about 0.13 to 0.6. The inherent viscosity (I.V.) as used herein is determined from a solution of 0.4 grams of the polymer to 100 ml. of 97 percent concentrated sulfuric acid maintained at 25° C.

After the conclusion of the first stage reaction, which normally takes at least 0.5 hour and preferably 1 to 3 hours, the foamed prepolymer is cooled and then powdered or pulverized in any conventional manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.1, preferably about 0.3 to about 2.5.

The temperature employed in the second stage is at least 250° C., preferably at least 325° C., and more preferably from about 350° C. to about 425° C. The second stage reaction generally takes at least 0.5 hour, and preferably from about 1 to 4 hours or more. The polybenzimidazole solution is allowed to cool to a temperature of about room temperature. (It is, of course, also possible to prepare the instant polymers via a one-step reaction. However, the previously-described two-step process is preferred).

The polybenzimidazole polymer solution prepared from the polymerization process is mixed with a solvent commonly recognized as being capable of dissolving the particular polybenzimidazole polymer which is chosen. For instance, the solvent may be selected from those commonly utilized in the formation of a polybenzimidazole dry (i.e., melt) or wet spinning solution. Illustrative examples of suitable solvents including N,N-dimethyl acetamide, N,N-dimethyl formamide, dimethyl sulfoxide, and N-methyl-2-pyrrolidone. The particularly preferred solvent is N,N-dimethyl acetamide. Additional representative solvents include formic acid, acetic acid and sulfuric acid.

The polymer solutions may be prepared, for example, by dissolving sufficient polybenzimidazole in the solvent to yield a final solution containing from about 5 to about 30 percent, by weight of the polymer, based on the total weight of the solution and preferably from about 10 to about 20 percent by weight. One suitable means for dissolving the polymer in the solvent is by mixing the materials at a temperature above the normal boiling point of the solvent, for example from about 25° C. to about 120° C. above such boiling point, and at a pressure of 2 to 15 atmospheres for 1 to 5 hours. The resulting solutions are preferably filtered to remove any undissolved polymer. A minor amount of lithium chloride (2 percent or less by weight based on the total solution weight) may be added to the solution in accordance with the teachings of U.S. Pat. No. 3,502,606. The lithium chloride prevents the polybenzimidazole polymer from phasing out of the solution upon standing for extended periods of time.

The polybenzimidazole polymer solution prepared above is next mixed with a superabsorbent polymer particulate to form a polybenzimidazole polymer/superabsorbent polymer particulate mixture. It is not critical to the process that the superabsorbent polymer particulate be soluble in the solvent of the polybenzimidazole polymer.

The superabsorbent polymer materials useful in this invention are water insoluble but water swellable polymers which are capable of absorbing many times their own weight of water or aqueous solutions. One useful superabsorbent polymer is made by grafting polyacrylic acid onto a water non-soluble polymer such as cellulose or starch, or by polymerizing starch or cellulose, at least one monomer having a polymerizable double bond which is water-soluble or becomes water-soluble by hydrolysis and a crosslinking agent, and subjecting, if necessary, the resulting product to hydrolysis. Suitable water-soluble monomers are carboxyl group-containing monomers, e.g., acrylic acids, carboxylic acid anhydride, carboxylic acid salt, sulfuric acid, hydroxyl, amide, as well as amino, and quaternary ammonium salt group-containing monomers. Suitable crosslinking agents include compounds having at least two polymerizable double bonds such as (i) di- or polyvinyl compounds; (ii) di- or poly-esters of unsaturated mono- or poly-carboxylic acids with polyols; (iii) bis(meth)acrylamides; (iv) carbamyl esters obtained by reacting polyisocyanates with hydroxyl group-containing monomers; (v) di- or poly(meth)allyl ethers of polyols; (vi) di- or poly-allyl esters of polycarboxylic acids; and (vii) esters of unsaturated mono- or poly-carboxylic acids with mono(meth)-allyl esters of polyols. These superabsorbent polymers are polymers of water soluble acrylic or vinyl monomers which are slightly crosslinked with a polyfunctional reactant. Examples of crosslinked polymers include polyvinylpyrrolidone, sulfonated polystyrene, polysulfoethyl acrylate, poly(2-hydroxyethylacrylate) polyacrylamide, polyacrylic acid, partial and complete alkali metal salts of polyacrylic acid, and the like. Also included are starch modified polyacrylic acids and hydrolyzed polyacrylonitrile and their alkali metal salts, and mixtures thereof.

Useful superabsorbent polymers can be made by polymerizing acrylic acid and starch in an aqueous medium using a polyfunctional monomer, e.g., N,N-alkylene-bisacrylamide, as the crosslinking agent. This process is described in U.S. Pat. No. 4,076,663.

Superabsorbent polymers can also be made as described in U.S. Pat. No. 4,340,706. These alkali metal acrylate or ammonium acrylate polymers are characterized as being excellent in salt solution-absorbency, and are produced by suspending an aqueous solution of acrylic acid and an alkali metal acrylate in an alicyclic or aliphatic hydrocarbon solvent containing a surfactant, e.g., sorbitan monolaurate, and subjecting the suspension to inverse suspension polymerization in the presence of a water-soluble radical polymerization initiator. Other superabsorbent polymers and processes for their manufacture are disclosed in U.S. Pat. Nos. 4,654,039, 3,669,103 and 3,670,731. All of the aforesaid patents are hereby incorporated by reference.

The superabsorbent polymers particularly useful in this invention are those described in U.S. Pat. No. 4,076,663 and U.S. Pat. No. 4,340,706. These superabsorbent polymers in particulate form have particle sizes of about 0.5 microns to about 450 microns and capable of absorbing at least about 12 times their weight of aqueous fluid. In a preferred embodiment superior absorption capabilities exist where the superabsorbent polymers in particulate form are less than about 20 microns in size. These superabsorbent polymer particles swell when they absorb aqueous fluids. The particles maintain the approximate shapes and geometry they had before contact with the fluid but the dimensions thereof are greatly enlarged The polybenzimidazole polymer solution may be mixed with the superabsorbent polymer particulate by any conventional method including simply combining the components in one vessel and stirring. The amount of the superabsorbent polymer particulate that is mixed with the polybenzimidazole polymer will vary depending on a number of factors including the amount of superabsorbent polymer particulates needed to produce suitable absorbance and the subsequent handling and processing to which the polybenzimidazole article will be subjected. The superabsorbent polymer particulate may be present within the polymer solution in an amount which will vary from about 0.1 to about 80 percent by weight and preferably from 5 to about 40 percent by weight based on the weight of the polybenzimidazole within the solution.

One suitable means for mixing the superabsorbent polymer particulate into the solvent solution is by combining the materials at room temperature and stirring them for a period of about 10 to about 45 minutes. It may be useful to heat the solution to a temperature of about 50° C. to about 150° C. for about 5 to 15 minutes to decrease the stirring time and to promote better dispersion of the superabsorbent polymer particulate throughout the polybenzimidazole polymer solution. The temperature of heating is not critical as long as it does not exceed 250° C.

Prior to the formation of the polybenzimidazole article containing superabsorbent polymer particulates within its structure, the solution should be filtered to remove any undissolved polybenzimidazole polymer or any excessively large superabsorbent polymer particulates. Once the superabsorbent polymer particulates have been mixed with the polybenzimidazole in solution, the solution may be converted into a polybenzimidazole polymer/superabsorbent polymer particulate article by any conventional technique.

For example, the polybenzimidazole polymer with dispersed superabsorbent polymer particulates prepared according to the above procedure, may be formed into flat film membranes by any conventional polybenzimidazole film procedures. The solution of polybenzimidazole polymer with superabsorbent polymer particulates may be deposited upon a support to form a wet film of the solution. The nature of the support is not critical and may be selected from a variety of materials including ceramic, glass, or metallic plates (e.g., stainless steel). The support is preferably provided with retaining elements, or raised edges, whereby the solution is confined to the surface thereof at the desired location until its consistency is such that retaining elements are no longer needed. Numerous techniques are available for the application of the solution to the support as will be apparent to those skilled in the art. For example, the polybenzimidazole polymer/superabsorbent polymer particulate solution may be simply poured upon a level support in a quantity sufficient for it to assume the desired uniform thickness. A blade may then be drawn over the surface of the wet film to aid the deposition of a wet film of uniform thickness.

The thickness of the wet film deposited upon the support is determined by the desired thickness of the polybenzimidazole polymer/superabsorbent polymer particulate film ultimately produce. Generally, the wet film is deposited upon the support in a substantially uniform thickness of about 2 to about 30 mils and preferably about 4 to about 10 mils. In a particularly preferred embodiment of the invention, the wet film is deposited in a thickness of about 4.5 to about 6.0 mils.

A quantity of solvent is next evaporated from the exposed surface of the wet film to allow the formation of a relatively thin solid layer of the exposed surface of the film. During the formation of the solid layer of the exposed surface of the film, the solvent present near the surface of the wet film is flashed off and a thin coagulated skin of polybenzimidazole polymer with dispersed superabsorbent polymer particulate remains.

The evaporation of solvent from the exposed surface of the wet film may be accomplished by a variety of techniques as will be apparent to those skilled in the art. For instance, a stream of air or other gas at ambient or an elevated temperature (e.g., approaching the boiling point of the solvent) may be simply directed at the exposed surface of the wet film. Other methods of evaporation are listed, for example, in U.S. Pat. No. 4,512,894, which is incorporated herein by reference. The time required to form the desired thin solid layer upon the exposed surface of the wet film commonly ranges from about 5 seconds to about 30 minutes, and preferably from about 15 seconds to about 5 minutes. In a preferred embodiment of the invention, the wet film is placed in an oven at about 70° C. and is exposed to a stream of circulating air at ambient pressure for about 1 to 5 minutes.

The film can then be washed in any conventional bath to remove excess solvent. After the wash step, the polybenzimidazole polymer/superabsorbent polymer particulate film may also be annealed by contract with a non-aqueous annealing medium which comprises both a solvent and a non-solvent for the polybenzimidazole polymer at a temperature preferably below about 125° C. For such an annealing step, see for example, U.S. Pat. No. 4,448,687, which is incorporated herein by reference.

The polybenzimidazole polymer with dispersed superabsorbent polymer particulates prepared according to the above procedure may be formed into filamentary material by any conventional polybenzimidazole filamentary procedure known to those skilled in the art. The polybenzimidazole polymer containing dispersed superabsorbent particulates may be spun to form a filamentry material. The term "continuous filamentary material" as used herein is intended to include monofilaments and multifilaments such as strand, yarn, cable, tow and the like.

The polybenzimidazolepolymer/superabsorbent polymer particulate solution necessary for preparation of filamentary material should contain sufficient polybenzimidazole to yield a final solution suitable for extrusion containing from about 10 to 45 percent by weight of the polybenzimidazole polymer with dispersed superabsorbent polymer particulate, based on the total weight of the solution, and preferably from about 20 to 30 percent by weight.

The polybenzimidazole polymers with dispersed superabsorbent polymer particulate may be formed into continuous filamentary materials by solution spinning, that is, by dry (i.e., melt) or wet spinning. A solution of the polybenzimidazole polymer with dispersed superabsorbent polymer particulates in an appropriate solvent, such as N,N-dimethylacetamide, is drawn through an opening of predetermined shape into an evaporative atmosphere for the solvent in which most of the solvent is evaporated (dry) or into a coagulation bath (wet), resulting in the polymer having the desired shape. In the preferred embodiment, the dry spinning method is used for casting the filamentary material.

The polybenzimidazolepolymer/superabsorbent-polymer particulate solution may be extruded through a spinnerette into a conventional-type down-draft spinning column containing a circulating inert gas, such as nitrogen, the noble gases, combustion gases or superheated steam. The spinnerette face should be at a temperature of from about 100° to 170° C. and the rest of the column from about 120° to a maximum of about 250° C. After leaving the spinning column, the continuous filamentary materials are taken up, for example, at a speed of from about 50 to 350 meters per minute. Further details for a method of dry spinning polybenzimidazole continuous filamentary materials are shown, for example, in U.S. Pat. No. 3,502,756, assigned to the same assignee as the present application, and this patent is incorporated herein by reference.

The polybenzimidazole polymer with dispersed superabsorbent particulate fiber or film prepared according to the process of this invention may also be impregnated with a chemical absorbent compound or resin having high surface area by mixing the polymer solution prior to coagulation with a chemical absorbent.

The addition of an absorbent resin will render the polybenzimidazole polymer/superabsorbent polymer particulate films or fibers chemically absorbent while retaining the advantages of the polybenzimidazole polymer structure. Uses for these products are in areas such as protective clothing which would absorb water and chemicals while being resistant to fire and heat. Such clothing is useful to military personnel or to chemical workers in the event of fire or explosion at a chemical plant.

The polybenzimidazole filamentary material may also be woven into fabrics for use as the first layer of a two layer fluid absorbent, flame resistant composite. Strengthening materials, such as Kevlar, polyester or nylon may also be woven with the polybenzimidazole filamentary material to add strength to the end product.

The second layer of the composite preferably is a foam material containing therein the superabsorbent polymer particulate. Any type of polymer which can be foamed can be used as the foam material for the superabsorbent polymer particulate. For example, cellular polystyrene, polyvinylchloride, copolymers of styrene N-acrylonitrile, and polyethylene foams can be manufactured by a conventional physical stabilization process. Cellular polystyrene, cellulose acetate, polyolefins and polyvinylchloride foams can be manufactured by any conventional decompression expansion process. However, the most versatile foams are produced from methods utilizing a chemical stabilization process for the production of foams such as polyurethane, polyisocyanates, polyphenols, epoxy resins and silicon resins.

In a preferred embodiment non-rigid polyurethane foams are used in the production of the composite. While a vast array of foamed products may be produced from polyurethanes ranging from soft thermoplastic elastomers to hard thermoset rigid foams, in a more preferred embodiment, flexible polyurethane foams are prepared.

Prior to foaming of the foamable polymer, super absorbent polymer particulates are added to the foamable polymer to enhance the fluid absorption capability of the resulting foam product. Additional products may also be added to the foamable polymer besides the superabsorbent polymer, such as surfactants, fillers or short staple fibers to further enhance the foam's properties. For example, in a preferred embodiment to assist in surface absorption, surfactants such as Pluronic-type surfactants are added prior to or as post-treatment to the foaming operation.

Once the superabsorbent polymer is prepared in its particulate form, it is blended with the foamable polymer. When mixing the superabsorbent polymer particulate with the foamable polymer, the percentage of the superabsorbent polymer particulate in relation to the foamable polymer present may vary depending upon the degree of absorption of fluids that is desired. The greater the percentage of the superabsorbent polymer particulate within the foam, the greater the absorbent capabilities of the foam. However, when the percentage of the superabsorbent polymer particulate approaches 90 percent, the structure of the foamed polymer begins to fall apart. Thus, in a preferred embodiment the percentage of superabsorbent polymer particulate within the superabsorbent polymer particulate/foamable polymer mixture should be in the range of about 2 to about 60 percent, and most preferably from about 2.5 to about 40 percent.

Once the superabsorbent polymer particulate is blended with the foamable polymer, any conventional foaming operation can be utilized to produce the foamed layer end product, including combining water with the superabsorbent polymer particulate and the foamable polymer. A chemical formulation process can be utilized to foam the polymer. When a polyurethane prepolymer is used as the foamable polymer and water is employed as the initiator for the foaming operation, the water reacts with the isocyanate groups to cause crosslinking and, as a by-product, produces carbon dioxide which causes the foaming. Foaming may also be accomplished by blending in a low boiling halocarbon, such as theylchloromethane or similar volatile materials.

Other processes for foaming other materials will depend upon the type of foamed end product that is desired. For example, an expandable formulation process or decompression expansion process can be used for the production of polystyrene or certain polyolefins. A frothing or dispersion process for the production of foams of latex rubber or urea-formaldehyde may also be used. The appropriate process will depend on the type of foamable polymer used and the end product sought.

When using the chemical formulation process with a foamable polyurethane prepolymer, the foaming of the ingredients begins immediately and concludes within about 1 to 60 minutes depending upon the thickness of the foamed materials. To hasten the curing time, the foamed material can be heated. However, it is critical that the foamed polymer not be heated to a temperature above about 250° C. since the preferred superabsorbent polymer of this process begins to break down at that temperature. Therefore, in a preferred embodiment the curing temperature of the foamed polymer with superabsorbent polymer particulate within its structure is from about 150° C. to about 250° C. for about 1 to about 15 minutes.

Following the foaming of the foamable polymer, the skeletal structure of the foam can be modified to provide greater openings in the cell structure. Cell structure is commonly expressed as the fraction of open cells. When a large portion of the cells are interconnected by gas spaces, the foam has a large fraction of open cells, an open-cell foam. Conversely, a large proportion of non-interconnecting cells results in a small fraction of open cells, a close-cell foam. By modifying the fraction of open cells of the polyurethane foam, the absorbency of the polyurethane foam can be increased or decreased as desired. Further, if the cells of the polyurethane foam contain the superabsorbent polymer particulate, the absorbency of the polyurethane foam will increase by an even greater margin.

For example, Japanese Patent Application Kokai, No. 57-92,032 (1982) discloses a polyurethane foam that contains a water absorbent polymer wherein the percentage of the closed cells is in the range of 1 to 60 percent, wherein the diameter of the cells is in the range of 200 to 400 microns, and the size of the water absorbent resin is in the range of 200 to 400 microns.

In conventional foaming operations the percentage of open cells may be as few as about 15 percent. To obtain increased open cell structures, the foam is subjected to a thermal process whereby the windows or membranes are removed from the individual cell bubbles which make up the foam structure. See for example U.S. Pat. Nos. 4,670,477, 3,171,820 and 3,175,025. When this procedure is allowed to go to completion, the percentage of open cells can increase to as high as 99 percent. The choice of the percentage of open cells will depend on the utility of the foam and can be modified to range from approximately 20 percent up to 99 percent. In general, the open cell structure should be in excess of 80 percent and most preferably, in excess of 95 percent. In general, foams with over 95 percent void space are known as "Reticulated" foams (see Whittington's Dictionary of Plastics for a complete definition of the term).

The polybenzimidazole fabric layer and the foam layer containing the superabsorbent polymer particulate can be bound together by any conventional bonding procedure including needle punched, air laid, resin bonding and melt bonding. In addition, any conventional adhesive web or adhesive material which will allow the bound material to retain its flexibility and water absorbance can be used to bind the layers together. In one preferred embodiment a polyamide adhesive web is used to bind the layers.

After the material shave been bound together, the composite material is allowed to cool to room temperature. The composite formed by this process can absorb up to 65 times and preferably up to 200 times the weight of the superabsorbent particulate present in the composite of water and fluids of similar density, and 15 times, preferably up to 100 times, the weight of the superabsorbent particulate present in the composite of a one percent saline solution. In addition, the material will not leak under an applied pressure of up to 80 psi. The following examples describes the invention in more detail. Percentages are by weight unless otherwise indicated.

EXAMPLE 1

A polybenzimidazole casting solution was prepared by mixing in a one liter container 800 grams of a 16 percent by weight polybenzimidazole dope (i.v. 0.7) which contained 128 grams of poly-2,2,-(m-phenylene)-5,5'-bibenzimidazole having a viscosity of 450 poise at 30° C., 7.7 grams of lithium chloride, and 672 grams of dimethylacetamide. The entire solution was stirred for about 30 minutes until a uniform blend was obtained.

The polymer solution was then extruded at a temperature of 160° C. through a 10 hole, 100 micron spinnerette under pressure into a conventional 23 foot dry spinning chamber containing circulating nitrogen heated to a temperature of 210° C. as the evaporative atmosphere. Fibers formed from this process were withdrawn from the column and wound onto a perforated bobbin at 200 meters per minute. This sample was subsequently pressure washed on the bobbin in a conventional water wash bath at a temperature of about 80° C. and then dried in an oven at a temperature of about 100° C. for about 30 minutes The polybenzimidazole fibers were converted into spun yarn and woven by a 2-harness shuttle loom process. To provide additional strength Kevlar fibers are woven into the polybenzimidazole material at every fifteenth position in both warp and filling to form a 7.5 osy polybenzimidazole polymer/Kevlar woven fabric. Attached to this polybenzimidazole polymer/Kevlar woven fabric was a polyurethane foam containing superabsorbent polymer particulates. A conventional polyurethane foam formulation of toluene diisocyanate and polyether polyol was modified by adding prior to the foaming process a sufficient amount of a superabsorbent polymer particulate to form a combination material containing 8 percent superabsorbent polymer particulates. The superabsorbent material is a graft copolymer of 91 percent acrylic acid and 9 percent oxidized starch crosslinked with 0.1 percent N,N-dimethylene-bis-acrylamide made by the process described in U.S. Pat. No. 4,076,663. The particle size of the superabsorbent material was generally less than about 30 microns.

A conventional soft polyurethane foam of one-eighth inch thickness was formed containing the superabsorbent polymer particulate. A section of this polyurethane/superabsorbent polymer form was laminated to the 7.5 osy polybenzimidazole Kevlar woven fabric by use of a 0.5 02/yd polyamide web as an adhesive at Kiss pressure of 1.5 psi on an electrically heated press at 115° C. for 30 seconds.

The composite which weights 11.0 osy absorbs 6 grams of water and 2 grams of 0.9 percent saline solution per gram of the composite within a 60 minute test interval.

A small scale flammability test (NFTA 701) was run on this material. After 12 seconds of exposure to the flame source, no measurable char-length, after-flame or drip-burn was observed. In addition, a Thermal Protective Performance (TPP) evaluation was also run on the material. The TPP evaluation is a standard test method to measure the ability of material to protect a person against second degree burns, employing a heat source of 2.0 cal/cm$^2$/sec., 50–50 radiant-convective heat (1850° F.). A copper calorimeter sensor measures the heat transferred through the fabric. The amount of time the material will deflect the heat sufficiently to prevent second degree burns is the measurement of TPP. This material showed a tolerance of 35 seconds.

EXAMPLE 2

A polybenzimidazole superabsorbent polymer membrane was prepared by combining 7.5 grams of a superabsorbent particulate material with 800 grams of a 10 percent by weight polybenzimidazole dope (i.v. 0.7) which was comprised of 130 grams of poly-2,2'(m-phenylene)-5-5'-bibenzimidazole with a viscosity of 450 poise at 30° C. and 7.7 grams of lithium chloride dissolved in 672 grams of dimethylacetamide.

The superabsorbent material is a graft copolymer of 91 percent acrylic acid and 9 percent oxidized starch crosslinked with 0.1 percent N,N'-methylene-bisacrylamide made by the process described in U.S. Pat. No. 4,076,663. The particle size of the superabsorbent material was generally less than about 20 microns.

An unannealed membrane was prepared by pouring a sufficient quantity of the polybenzimidazole/superabsorbent polymer solution on a non-woven polyester fabric marketed by Eaton-Dikeman under the trademark Hollytex to form a 4 mil. thick polybenzimidazole polymer/superabsorbent polymer membrane. The membrane was dried at room temperature (with air velocity of 1200 ft/min) for 12 hours. It was then washed with water at a temperature of 80° C. several times in a series of conventional was: baths and subsequently air dried for about 5 hours.

The polybenzimidazole film containing superabsorbent polymer particulates absorbs 26 grams per gram of water per gram of the superabsorbent material and 12 grams of in a 0.9 percent saline solution per gram of the superabsorbent material.

A small scale flammability test (NFTA 701) was run on this material. After 12 seconds of exposure to the flame source, no measurable char-length, after-flame or drip-burn was observed.

EXAMPLE 3

A polybenzimidazole membrane was prepared by combining 15 grams of a superabsorbent polymer particulate material with a 10 percent by weight polybenzimidazole dope (i.v. 0.7) which was comprised of 128 grams of poly-2,2'(m-phenylene)-5-5'-bitenzimidazole with a viscosity of 450 poise at 30° C. and 7.7 grams of lithium chloride dissolved in 672 grams of dimethylacetamide.

The superabsorbent material is a graft copolymer of 91 percent acrylic acid and 9 percent oxidized starch crosslinked with 0.1 percent N,N'-methylene-bisacrylamide made by the process described in U.S. Pat. No. 4,076,663. The particle size of the superabsorbent material was generally less than about 20 microns.

An unannealed membrane was prepared by pouring a sufficient quantity of the polybenzimidazole polymer/-superabsorbent polymer particulate solvent solution on a non-woven polyester fabric marketed by Eaton-Dikeman under the trademark Hollytex to form a 8 mil. thick polybenzimidazole polymer/superabsorbent polymer particulate membrane. The membrane was dried at room temperature (with air velocity of 1200 ft/min) for 12 hours. It was then washed with water at a temperature of 80° C. several times in a series of conventional wash baths and subsequently air dried for about 5 hours.

The polybenzimidazole film containing superabsorbent polymer particulates absorbs 14 grams of water per gram of the superabsorbent material and 6 grams of a 0.9 percent saline solution per gram of the superabsorbent material.

A small scale flammability test (NFTA 701) was run on this material. After 12 seconds of exposure to the flame source, no measurable char-length, after-flame or drip-burn was observed.

As is apparent from this procedure, polybenzimidazole films and polybenzimidazole composite materials can be produced containing a superabsorbent polymer. These polybenzimidazole materials show high degrees of water absorbance and, in addition, show low flammability and heat transfer properties.

What is claimed:

1. A polybenzimidazole polymer/superabsorbent polymer composite product comprising:
   (a) a polybenzimidazole polymer material first layer;
   (b) a superabsorbent polymer particulate material containing second layer; and
   (c) means for binding the polybenzimidazole polymer layer to the superabsorbent polymer layer.

2. The composite product of claim 1 wherein the superabsorbent polymer a flexible polyurethane foam.

3. The composite product of claim 1 wherein the superabsorbent polymer is a polymer of starch or cellulose, a water soluble acrylic or vinyl monomers slightly crosslinked with a polyfunctional reactant.

4. The composite product of claim 3 wherein the crosslinked polymers are selected from the group consisting of polyvinylpyrrolidone, sulfonated polystyrene, polysulfoethyl acrylate, poly(2-hydroxyethylacrylate)-polyacrylamide, polyacrylic acid, partial and complete alkali metal salts of polyacrylic acid, starch modified polyacrylic acids and hydrolyzed polyacrylonitrile and their alkali metal salts, and mixtures thereof.

5. The composite product of claim wherein the polybenzimidazole polymer first layer contains a material selected from Kevlar, polyester and nylon fibers.

6. The composite product of claim 1 wherein the superabsorbent polymer particulate material is blended with a foamable polymer.

7. The composite product of claim 6 wherein the superabsorbent polymer particulate within the superabsorbent polymer particulate/foamable polymer blend is from about 2 to about 60 percent.

8. The product of claim 1 wherein the polybenzimidazole polymer consists essentially of recurring units of the formula:

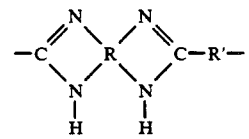

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

9. The product of claim 1 wherein the polybenzimidazole polymer consists essentially of recurring units of the formula:

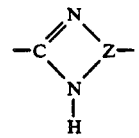

wherein Z is an aromatic nucleus having the nitrogen atoms forming the benzimidazole ring paired upon adjacent carbon atoms of the aromatic nucleus.

10. The product of claim 1 wherein the polybenzimidazole polymer is poly-2,2'-(m-phenylene)-5,5'-bibenzimidazole.

11. The product of claim 1 wherein the product absorbs aqueous fluids in an amount at least about 12 times the weight of the superabsorbent polymer present within the product.

12. The product of claim 1 wherein the percentage of polybenzimidazole in the polybenzimidazole polymer solution is from about 5 to about 25 percent.

13. A polybenzimidazole polymer product containing a super absorbent polymer produced by the process comprising the steps of:
    (a) preparing a polybenzimidazole polymer solution in a dispersing solvent;
    (b) mixing with said polybenzimidazole polymer solution a superabsorbent polymer; and
    (c) forming a polybenzimidazole polymer product having the superabsorbent polymer interspersed within its structure.

14. A polybenzimidazole polymer filament containing a superabsorbent polymer produced by a process comprising the steps of:
    (a) preparing a polybenzimidazole polymer solution in a dispersing solvent;
    (b) mixing with said polybenzimidazole polymer solution a superabsorbent polymer; and
    (c) spinning the polybenzimidazole polymer having said superabsorbent polymer interspersed within its structure into a polybenzimidazole polymer filament.

15. A polybenzimidazole polymer film containing a superabsorbent polymer produced by the process comprising the steps of:
    (a) preparing a polybenzimidazole polymer solution in a dispersing solvent;
    (b) mixing with said polybenzimidazole polymer solution a superabsorbent polymer; and
    (c) casting the polybenzimidazole polymer having said superabsorbent polymer interspersed within its structure into a polybenzimidazole polymer film.

16. The product of any of claims 13, 14 or 15 wherein the superabsorbent polymer is a graph copolymer of acrylic acid and starch cross-linked with a diunsaturated monomer.

17. The product of any of claims 13, 14 or 15 wherein the superabsorbent polymer is a graph polymer of acrylic acid and starch cross-linked with a diunsatruated monomer.

18. The product of any of claims 13, 14 or 15 wherein the polybenzimidazole polymer consists essentially of the recurring unit of the formula:

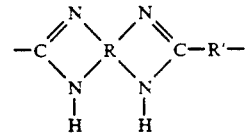

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene. and (f) pyran.

19. The product of any of claims 13, 14 or 15 wherein the polybenzimidazole polymer consists essentially of the recurring units of the formula:

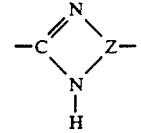

wherein Z is an aromatic nucleus having the nitrogen atoms forming the benzimidazole ring paired upon adjacent carbon atoms of the aromatic nucleus.

20. The product of any of claims 13, 14 or 15 wherein the polybenzimidazole polymer is poly-2,2,-(x-phenylene)-5,5,-bibenzimidazole.

21. The product of any of claims 13, 14 or 15 wherein the article absorbs aqueous fluids in an amount at least about 12 times the weight of the superabsorbent polymer present within the product.

22. The product of any one of claims 14 or 15 wherein the percentage of the polybenzimidazole in the polybenzimidazole polymer solution is from about 5 to about 25 percent.

23. The product of any of claims 13, 14 or 15 wherein the superabsorbent polymer particulate mixed with the polybenzimidazole polymer solution is present in an amount from about 0.1 to about 80 percent by weight based on the weight of the polybenzimidazole polymer in the solution.

* * * * *